United States Patent [19]

Nakamura et al.

[11] Patent Number: 4,983,311
[45] Date of Patent: Jan. 8, 1991

[54] MAGNETIC COATING AND MAGNETIC RECORDING MEDIUM

[75] Inventors: Eitaro Nakamura, Tokyo; Masahiro Yamakawa, Kawasaki; Akira Nakayama, Yokosuka; Fumio Takano, Kawasaki, all of Japan

[73] Assignee: Nippon Zeon Co., Ltd., Tokyo, Japan

[21] Appl. No.: 425,963

[22] Filed: Oct. 24, 1989

[30] Foreign Application Priority Data

Oct. 26, 1988 [JP] Japan .................... 63-270573

[51] Int. Cl.$^5$ .............................................. C04B 35/04
[52] U.S. Cl. .................................. 252/62.54; 428/403; 428/694; 428/900; 428/523; 427/127; 427/128
[58] Field of Search ...................... 252/62.54; 428/694, 428/403, 900, 523; 427/127, 128

[56] References Cited

U.S. PATENT DOCUMENTS

| | | |
|---|---|---|
| 4,600,521 | 7/1986 | Nakamura et al. ............. 252/62.54 |
| 4,650,717 | 3/1987 | Ota ................................. 252/62.54 |
| 4,678,708 | 7/1987 | Shimada et al. ................ 252/62.54 |
| 4,687,705 | 8/1987 | Miyatsuka ...................... 252/62.54 |
| 4,707,410 | 11/1987 | Hata ............................... 252/62.54 |
| 4,707,411 | 11/1987 | Nakayama et al. ............. 252/62.54 |
| 4,743,501 | 5/1988 | Eguchi et al. .................. 252/62.54 |
| 4,748,084 | 5/1988 | Hata et al. ..................... 252/62.54 |
| 4,752,530 | 6/1988 | Yamada et al. ................ 252/62.54 |
| 4,770,941 | 9/1988 | Imai et al. ..................... 252/62.54 |
| 4,784,913 | 11/1988 | Nakumura et al. ............. 252/62.54 |
| 4,797,324 | 1/1989 | Hata ............................... 252/62.54 |
| 4,818,781 | 4/1989 | Yamakawa et al. ............ 524/407 |
| 4,842,942 | 6/1989 | Yatsuka et al. ................ 428/694 |

FOREIGN PATENT DOCUMENTS

| | | | |
|---|---|---|---|
| 63-9296 | 8/1980 | Japan ............................. 252/62.54 |
| 60-206876 | 3/1984 | Japan ............................. 252/62.54 |

*Primary Examiner*—William R. Dixon, Jr.
*Assistant Examiner*—Paul Marcantoni
*Attorney, Agent, or Firm*—Sherman and Shalloway

[57] ABSTRACT

A magnetic coating comprising magnetic powder, a binder and an organic solvent, characterized in that at least one component of the binder is a vinyl chloride copolymer having hydroxyl group, and carboxylic acid groups or sulfur- or phosphorus-containing strong acid radicals, and the comonomer supplying the hydroxyl groups is a monoallyl ether of polyhydroxy compound, and a magnetic recording medium made by coating a substrate with the magnetic coating.

8 Claims, No Drawings

MAGNETIC COATING AND MAGNETIC RECORDING MEDIUM

This invention relates to a magnetic coating containing a vinyl chloride series copolymer as a binder for magnetic powder, and a magnetic recording medium made using the same.

A magnetic recording medium such as a magnetic tape or floppy disk is generally prepared by coating a substrate such as a polymeric film or sheet with a magnetic coating obtained by dispersing strongly magnetic powder and a macromolecule as a binder in an organic solvent.

There are many cases where a relatively hard resin such as PVC, polyvinyl butyral, nitrocellulose or acetylcellulose, and a relatively soft resin such as a polyester, polyurethane or acrylonitrile-butadiene copolymer are used in combination. Further, there are many cases where a polyisocyanate compound is used as a thermosetting component in order to enhance the durability of the finished coat. Thus, a resin to be used as a binder is required not only to have compatibility with another macromolecule and proper reactivity with a polyisocyanate, but to have good compatibility with magnetic powder and an action to uniformly disperse it in the coating.

Recently, in accordance with request for the enhancement of recording density and improvement of ratio of magnetic recording media, magnetic powder is becoming more minute and coming to have a higher magnetic force resistance. Thus, in order to attain enhancement of the performances as the above medium by uniformly dispersing the magnetic powder in the coating and forming a smooth magnetic layer having a high filling degree, the dispersing ability of the binder becomes a determinatively important factor.

Surfactants having a low molecular weight are generally used as a dispersing agent in order to improve the dispersion of magnetic powder. However, since use of a dispersing agent in a great amount brings about lowering of durability and reliability of the magnetic recording medium and stain of the head and the like, it is required for the binder itself to have a high dispersion power.

On the other hand, it is widely carried out, particularly in magnetic tapes for picture recording, to incorporate in the coating a hardenable compound including a polyisocyanate and to crosslink the magnetic layer and make it a coat, in order to enhance the durability and reliability of the medium. Thus, the binder is required to have a suitable reactivity with a polyisocyanate. In this connection, too good reactivity is uneconomical because the pot life of the coating becomes short, and too slow reactivity brings about no expected enhancement of durability and travelling performance As representative examples of binders capable of bringing about magnetic recording media of high performances, vinyl chloride-vinyl alcohol or maleic acid-vinyl acetate copolymers have been proposed. Among them in case of vinyl chloride-vinyl alcohol-vinyl acetate copolymers, dispersibility of the magnetic powder is enhanced as the rate of the vinyl alcohol is increased, but the degree is low and assistance of a dispersing agent is required, and moreover, in accordance with the increase of amount of the vinyl alcohol pot life becomes short, moisture resistance of the coat is lowered and speed of thermal decomposition becomes fast. On the other hand, although vinyl chloride-maleic acid-vinyl acetate copolymers strongly adsorb on magnetic powder and display an excellent dispersion power, the coating is apt to be thickened and gelate, and further, local reaction with the polyisocyanate is apt to occur.

As a trial for solving these problems in the representative PVC binders, vinyl chloride-vinyl alcohol-vinyl acetate-maleic acid copolymers have been proposed. These copolymers have both good reactivity of vinyl chloride-vinyl alcohol-vinyl acetate copolymers and good dispersion power of vinyl chloride-maleic acid-vinyl acetate copolymers, but the level is low and still far from satisfactory. Further, although this copolymer is usually obtained by saponifying a vinyl chloride-maleic acid-vinyl acetate copolymer, the polymer is deteriorated during saponification and thus the resulting polymer is poor in chemical heat stability.

Although as another trial a method using a vinyl chloride-hydroxyethyl acrylate-acrylic acid copolymer has been proposed, if comparatively much amount of hydroxyethyl acrylate is used in order to satisfy the solubility in the solvent, pot life at the time of addition of a polyisocyanate compound becomes shortened. On the other hand, if the amount in copolymerization of the hydroxyethyl acrylate is reduced to a degree such that pot life becomes suitable, solubility in the solvent is lowered and the solution is liable to gelate and be thickened.

As a result of vigorous investigation about a method for solving the problems of the usual PVC containing alcoholic hydoxyl groups, the present inventors have found that a particular vinyl chloride copolymer prepared using a monoallyl ether of a polyhydroxy compound as a comonomer giving a hydroxyl group exhibits excellent magnetic powder-dispersing power and an excellent stability with lapse time of its dispersion, has a good reactivity with the polyisocyanate in spite of very low content of the hydroxyl groups, and is excellent in chemical heat stability. They have further found that a magnetic recording medium obtained by coating a polyester film with a magnetic coating containing this copolymer as a binder and a polyisocyanate as a hardening agent has good surface smoothness and durability of the coat and excellent travelling performance, magnetic characteristics and electromagnetic conversion characteristics.

Thus, according to the invention there is provided a magnetic coating comprising magnetic powder, a binder and an organic solvent, characterized in that at least one component of the binder is a vinyl chloride copolymer having hydroxyl groups, and carboxylic acid groups or sulfur or phosphorus -containing strong acid radicals, and the comonomer supplying the hydroxyl groups is a monoallyl ether of polyhydroxy compound; and a magnetic recording medium prepared using the magnetic coating.

The monoallyl ether of a polyhydroxy compound is used in an amount in a range such that the content of the hydroxyl groups in the copolymer becomes 0.05 to 3.0 wt.%, preferably 0.1 to 2.0 wt.%. If the content is under 0.03 wt. %, a crosslinking effect with the polyisocyanate is not displayed, and if the content is above 3.0 wt.%, pot life becomes too short.

Examples of the monoallyl ether of a polyhydroxy compound giving hydroxyl groups to the copolymer in the invention include, the example, alkylene glycol monoallyl ethers such as allyl 2-hydroxyethyl ether, allyl 2-hydroxypropyl ether, allyl 3-hydroxypropyl ether, allyl 2-hydroxybutyl ether, allyl 3-hydroxybutyl ether, allyl 4-hydroxybutyl ether an allyl 6-hydroxyhexyl ether; polyoxyalkylene glycol monoallyl ethers such as diethylene glycol monoallyl ether and dipropylene glycol monoauyl ether; glycerin monoallyl ether; the monoally ethers of halogen- or hydroxy- substituted (poly)alkylene glycol such as allyl 2-chloro-3-hydroxypropyl ether and allyl 2-hydroxy-3-chloropropyl ether; and monoallyl ethers of polyhydric phenol and their halogen-substituted derivatives such as engenol and isoengenol. Besides the above exemplified ethers of an allyl alcohol with a polyhydroxy compound, thioethers of an allyl alcohol with a polyhydroxy compound are usable as a comonomer to give the hydroxyl groups in the invention, and examples thereof include allyl 2-hydroxyethyl thioether and allyl 2-hydroxypropyl thioether.

A carboxylic acid group-containing comonomer may be used in order to give carboxylic acid groups to the copolymer of the invention. As the carboxylic acid group-containing comonomer is usable an unsaturated monoor dicarboxylic acid such as acrylic acid, methacrylic acid, maleic acid, itaconic acid or crotonic acid ; a monoalkyl ester of unsaturated dicarboxylic acid such as maleic acid or itaconic acid ; or the like. It is preferred that the comonomer is used in a range such that the content of the carboxylic acid groups in the copolymer becomes 0.3 to 5.0 wt. %. If the content is less than 0.3 wt. %, dispersibility of the magnetic powder becomes poor, and if the content is more than 5.0 wt.%, the coating is apt to gelate and be thickened.

It is necessary that the equivalent ratio of the hydroxyl groups to the carboxylic acid groups is 0.1 to 3.0, preferably 0.2 to 2.0. If the ratio goes beyond 3.0, dispersibility of the magnetic powder is strikingly lowered, and if the ratio is under 0.1, there arises no effect by addition of the polyhydroxy compound.

As the comonomer for introducing sulfur- or phosphorus-containing strong acid radicals into the copolymer in the invention, there may be used a radically polymerizable monomer having a strong acid containing sulfur or phosphorus such as sulfonic acid, sulfuric acid, phosphoric acid or phosphonic acid or its an alkali metal or ammonium salt. Among them radically polymerizable monomers having a sulfonic acid or its salt are readily available, and abound in its kind. For example, there may be mentioned such acids as vinylsulfonic acid, methylvinylsulfonic acid, (meth)allylsulfonic acid, styrenesulfonic acid, ethyl(meth)acrylic acid-2-sulfonate, 2-acrylamido-2-methylpropanesulfonic acid and 3-allyloxy-2-hydroxypropanesulfonic acid, and their alkali metal and ammonium salts. Further, examples of the monomer having sulfuric acid or its salt include such acids as (meth)-acrylic acid-2-sulfuric acid ethyl ester and 3-allyloxy-2-hydroxypropanesulfuric acid and their alkali metal or ammonium salts. Further, examples of the monomer having a salt of phosphoric acid include such acids as propyl (meth)acrylic acid-3-chloro-2-phosphate, ethyl (meth)-acrylic acid-2-phosphate and 3-allyloxy-2-hydroxypropane-phosphoric acid, and their alkali metal or ammonium salts. Examples of the monomer having a salt of phosphonic acid include such acids as vinylphosphonic acid, acrylamidomethanephosphonic acid, 2-phosphonic acid ethyl-(meth)acrylate and 3-allyloxy-2-hydroxypropanephosphoric acid, and their alkali or ammonium salts.

The content of the strong acid radicals containing sulfur or phosphorus in the copolymer may be range from 0.1 to 4.0 wt.%, preferably 0.3 to 2.0 wt.% in terms the amount of $SO_4^{--}$ or $PO_4^{---}$ when the copolymer is burnt by the oxygen-burning flask method and then the amount of sulfur or phosphorus in the copolymer is measured as sulfuric acid or phosphoric acid. If the content is below 0.1 wt.%, the dispersibility of the magnetic powder becomes inadequate, and if the content goes beyond 4.0 wt.%, hydrophilicity of the strong acid radicals becomes stronger and solubility into the solvent becomes inadequate, and moreover, moisture resistance of the coat is lowered and aggregation of the magnetic powder occurs and thus the dispersibility becomes worse on the contrary.

It is possible, if necessary, to use another copolymerizable comonomer together. Examples of another comonomer include carboxylic acid vinyl esters such as vinyl acetate and vinyl propionate; vinyl ethers such as methyl vinyl ether, isobutyl vinyl ether and ethyl vinyl ether; vinylidenes such as vinylidene chloride and vinylidene fluoride; unsaturated carboxylic acids such as acrylic acid, methacrylic acid, maleic acid and itaconic acid; unsaturated carboxylic anhydrides such as maleic anhydride ; unsaturated carboxylic acid alkyl esters such as diethyl maleate, dibutyl maleate, diethyl itaconate, methyl (meth)acrylate and ethyl (meth)acrylate; olefins such as ethylene and propylene unsaturated nitriles such as acrylonitrile ; aromatic vinyls such as styrene, alpha-methylstyrene and p-methylstyrene; epoxy-containing monomers such as allyl glycidyl ether, glycidyl methacrylate, vinylcyclohexane monooxide; etc.

These comonomers are used for the purpose of enhancing solubility of the copolymer while adjusting compatibility of the copolymer and another resin and the softening point when they are mixed together.

When the epoxy-containing monomer is copolymerized with a hydroxyl group-containing monomer and vinyl acetate, it is also possible to link an alkali metal or ammonium salt of a strong acid containing sulfur or phosphorus to the epoxy site, in an aqueous or nonaqueous system, during, before or after the copolymerization reaction. Examples of the alkali metal or ammonium salt of a strong acid containing sulfur or phosphorus include potassium sulfite, sodium thiosulfate, ammonium hydrogen sulfate, disodium hydrogen phosphate, ammonium hydrogen phosphite, potassium sulfanilate, potassium persulfate and sodium superphosphate. This method of addition of the strong acid salt containing sulfur or phosphorus in copolymerization of the epoxy group-containing monomer with vinyl chloride is described in more detail in Japanese Laid-Open Patent Publication Nos. 238306/1985, 238371/1985 and 53367/1986.

Polymerization degree of the copolymer is 200 to 900, preferably 250 to 500. If the value is under 200 the abrasion resistance of the magnetic layer is inadequate, and in the value above 900 the viscosity of the coating becomes high and dispersion of the magnetic powder is liable to become inadequate.

The copolymer in the invention can be prepared using any known polymerization method. It is preferred from the point of solubility of the copolymer to prepare the copolymer either by the solution polymerization method or by the suspension polymerization method using as a polymerization solvent, a lower alcohol such as methanol or ethanol or a mixed solvent of a lower alcohol and deionized water. When a water soluble salt having a strong acid radical containing sulfur or phosphorus is used in the reaction, emulsion polymerization is favorable. Examples of the polymerization initiator to be used in preparation of the copolymer include organic peroxides such as lauroyl peroxide, diisopropyl peroxydicarbonate, di-2-ethylhexyl peroxydicarbonate, t-butyl peroxypivalate and 3,5,5-trimethylhexanoyl peroxide ; azo compounds such as alpha, alpha'-azobisisobutyronitrile ; and persulfates such as ammonium persulfate and potassium persulfate. Examples of the suspending agent include polyvinyl alcohol; partially saponified poly(vinyl acetate) ; cellulose derivatives such as methylcellulose ; synthetic high molecular substances such as polyvinylpyrrolidone, maleic anhydride-vinyl acetate copolymer and polyacrylamide ; natural high molecular substances such as starch and gelatin; etc. Further, examples of the emulsifying agent include anionic emulsifiers such as sodium alkylbenzenesulfonate and sodium lauryl sulfate ; nonionic emulsifiers such as polyoxyethylene alkyl ether and polyoxyethlenesorbitan fatty acid partial esters ; etc. Further, if necessary, a molecular weight-adjusting agent such as trichloroethylene or thioglycol may also be used. The afore-mentioned polymerization initiator, vinyl chloride and another monomer, suspending agent, emulsifying agent, molecular weight-adjusting agent and the like may be added to the polymerization system either all at once at the start of polymerization or in portions during the polymerization. The polymerization is usually carried out at 35 to 80 ° C. under stirring.

The thus obtained vinyl chloride copolymer, like usual vinyl chloride series resin binders for magnetic coatings, is prepared as a solution in any solvent containing it generally together with a polyurethane resin, a hardening agent represented by one of polyisocyanate series and magnetic powder and the like, and then used.

There may representatively be mentioned as the polyurethane resin a product obtained by reaction of a polyester polyol or polyether polyol with an isocyanate, and one having the remaining hydroxyl groups is particulary preferred. Further, it is also possible, if desired, to use together therewith within the range not to spoil the objects of the invention a usual resin binder for use in magnetic coatings such as a vinyl chloride-vinyl acetate copolymer resin, fibrin resin, phenol resin, epoxy resin, butyryl resin, acryl series resin or acrylonitrile-butadiene rubber.

Further, there may be used as the magnetic powder of iron oxide such as gamma-$Fe_2O_3$, $Fe_3O_4$, Co-containing gamma-$Fe_2O_3$ or Co-containing $Fe_3O_4$; powder of chromium oxide such as $CrO_2$; or further metal powder such as Fe powder or Fe-Co powder.

The copolymer in the invention is one prepared using a monoallyl ether of polyhydroxy compound in place of a partially saponified vinyl acetate, as a hydroxyl group-containing component and thus has a much enhanced reactivity with the isocyanate, and thereby the amount of the hydroxyl groups necessary for the reaction may greatly by reduced. Although the reason is not clear, the reason seems to be that the hydroxyl groups, which take part in the reaction, are distant from the main chain of the copolymer and thus have an increased degree of freedom, and that distribution of the hydroxyl groups is uniform.

The reason why dispersibility of the magnetic powder is greatly enhanced seems to be that since the reaction is accomplished with a small amount of hydroxyl groups, interaction between the carboxyl groups and hydroxyl groups decreases. Further, the reason why the stability in dispersion of the magnetic coating is high is considered to be that the interaction with a fatty acid conventionally used as a lubricant is small.

The invention is further described specifically by examples. The part numbers and % numbers in each example are based on weight.

EXAMPLE 1

After deaeration of an autoclave, 100 parts of vinyl chloride, 3 parts of glycerin monoallyl ether, 180 parts of acetone and 2 parts of benzoyl peroxide were charged in the autoclave. Immediately after the start of polymerization at 50° C., a previous adequate mixture of 3 parts of maleic anhydride, 10 parts of vinylidene chloride and 40 parts of methanol was continuously poured into the autoclave. When the pressure of reaction became 1 kg/cm$^2$, the unreacted vinyl chloride was recovered, 250 parts of water was added followed by heating to 70° C. to separate a copolymer from the solvent, and the copolymer was dried (Copolymer A).

EXAMPLE 2

Deionized water (120 parts), 0.6 part of methylcellulose, 0.2 part of sodium lauryl sulfate and 1.2 parts of lauroyl peroxide were charged in an autoclave, and after deaeration, vinyl chloride (100 parts), 8 parts of vinyl acetate, 5 parts of allyl 2-hydroxyethyl ether, 3 parts of itaconic acid and 120 parts of methanol were charged, and polymerization was started at 60° C. When the pressure of autoclave became 3 kg/cm$^2$, the unreacted vinyl chloride was recovered. The liquid part was removed from the mixture to recover a copolymer, which was then washed with cold water and dried (Copolymer B).

EXAMPLE 3

The procedure of Example 2 was repeated except that allyl 2-hydroxy-3-chloropropyl ether was used in place of allyl 2-hydroxyethyl ether to obtain copolymer C.

EXAMPLE 4

Deionized water 150 parts, 1 part of azobisisobutyronitrile, 1 part of polyoxyethylene stearyl ether and 0.1 part of methylcellulose were charged in an autoclave. After deaeration, 60 parts of vinyl chloride, 5 parts of allyl 2-hydroxypropyl ether, 2 parts of monomethyl maleate and 8 parts of vinyl acetate were charged, and polymerization was started at 60 ° C. Total 40 parts of vinyl chloride was continuously poured in the autoclave over 3 hours to 7 hours after the start of polymerization. When the pressure of autoclave became 3 kg/cm$^2$, the unreacted vinyl chloride was recovered, and the remaining mixture was dehydrated to give a solid, which was then washed with deionized water and dried to obtain copolymer D.

EXAMPLE 5

The procedure of Example 4 was repeated except that allyl 6-hydroxyhexyl ether was used in place of allyl 2-hydroxypropyl ether to obtain copolymer E.

COMPARATIVE EXAMPLE 1

The procedure of Example 1 was repeated except that 2-hydroxyethyl methacrylate was used in place of glycerin monoallyl ether to obtain copolymer F.

COMPARATIVE EXAMPLE 2

After deaeration of an autoclave, 100 parts of vinyl chloride, 10 parts of isobutyl vinyl ether, 180 parts of acetone and 2 parts of benzoyl peroxide were charged in the autoclave, and polymerization was started at 55° C. Immediately thereafter a mixed liquid of 4.5 part of acrylic acid, 1.5 parts of water and 44 parts of methanol, and a mixed liquid of 5 parts of 2-hydroxyethyl methacrylate and 45 parts of methanol were respectively continuously poured, in the total amount into the autoclave from the separate inlets by the time when the pressure of autoclave became 2.0 kg/cm$^2$. When the pressure became 1.0 kg/cm$^2$, the unreacted vinyl chloride was recovered. Deionized water (250 parts) was added to the remaining mixture and the resulting mixture was heated to separate a copolymer from the solvent, which was then dried to obtain copolymer G.

COMPARATIVE EXAMPLE 3

The procedure of Example 4 was repeated except that hydroxypropyl methacrylate was used in place of allyl 2-hydroxypropyl ether to obtain copolymer H.

COMPARATIVE EXAMPLE 4

The procedure of Example 2 was repeated except that the amount of 2-hydroxyethyl methacrylate was 20 parts and isobutyl vinyl ether was not used to obtain copolymer I.

COMPARATIVE EXAMPLES 5 TO 7

After deaeration of an autoclave, 50 parts of vinyl chloride, 20 parts of vinyl acetate, 180 parts of acetone and 2 parts of benzoyl peroxide were charged in an autoclave, and polymerization was started at 55° C. Every time the pressure of autoclave was lowered by 0.5 kg/cm$^2$, 10 part portions of vinyl chloride were poured therein 5 times in total 50 parts. On the other hand, 5 parts of maleic anhydride and 45 parts of methanol were continuously poured into the autoclave just after the start of polymerization. When the pressure of autoclave became 1 kg/cm$^2$, the unreacted vinyl chloride was recovered. The remaining reaction solution was added to a mixed liquid of 5000 parts of methanol and 6 parts of 65 % nitric acid, and mixed with stirring at 70° C. for 12 hours. Then, 1,000 parts of deionized water was added and the copolymer was separated and collected from the medium. Thereafter, 500 parts of acetone and the whole copolymer were mixed with stirring at 60° C. After addition of 1,000 parts of methanol, the copolymer was separated and collected, washed with water and dried to obtain copolymer J.

The characteristics of copolymers A to J obtained by the above examples and comparative examples were indicated in Table 1 together with those of commercially available vinyl chloride-vinyl acetate-maleic acid terpolymer (Copolymer K) and vinyl chloride-vinyl acetatevinyl alcohol copolymer (Copolymer L). The percent of the carboxy groups in the copolymer and the percent of the hydroxyl groups therein were determined by titration and by the infrared absorption analysis, respectively.

TEST EXAMPLE 1

Performances of the above copolymers A to L as a magnetic coating and a magnetic recording medium were tested by the following methods. The results are shown in Table 1.

1) Pot life

The vinyl chloride copolymer (100 parts) was dissolved in a mixed solvent of 200 parts of methyl ethyl ketone, 100 parts of methyl isobutyl ketone and 100 parts of toluene by stirring at 65° C. for 1 hour. A polyisocyanate (CORONATE-L made by Nippon Plyurethane Kogyo Co.,Ltd.) in an amount of 20 parts per 100 parts of the vinyl chloride copolymer was added to the resulting solution, and the mixture was preserved. The days required for the solution to come to no longer flow when the vessel was turned upside down were measured and recorded "Pot life".

2) Reactivity

The solution used for the pot life test was cast on a glass plate to obtain a sheet, which was then subjected to heat treatment at 60° C. for 24 hours Then, 0.5 g of the sheet was precisely weighed and left for 24 hours in 50 g of tetrahydrofuran. The insoluble matter was collected by filtration, washed, dried and precisely weighed. Gel fraction was calculated according to the following equation, and recorded as "reactivity":

Gel fraction = weight of insoluble matter/- sample weight (%)

3) Heat stability

The solution used for the pot life test was cast on a glass plate maintained horizontally with a level to obtain a sheet 0.2 mm thick. This sheet was, according to JIS-K-6723, heated in an oil bath of 80° C., and the time (hours) taken for a congo red paper to discolor was measured and recorded as "heat stability".

4) Glossiness

The mixture consisting of 400 parts of cobalt-covered magnetic iron oxide powder (specific surface area: 30 m$^2$/g), 50 parts of the vinyl chloride copolymer, 40 parts of a polyurethane resin (amount of the hydroxyl groups 0.3 %, 1.4-butanediol adipate-MDI series, molecular weight 70,000), 500 parts of methyl ethyl ketone, 300 parts of methyl isobutyl ketone, 300 parts of toluene, 2 parts of carbon black, 4 parts of alumina, 2 parts of myristic acid and 1 part of butyl stearate was sheared with high speed for 90 minutes to give a dispersion. Then, 15 parts of polyisocyanate (CORONATE-L made by Nippon Polyurethane kogyo Co., Ltd.) was added thereto and subjected to the above dispersing procedure for 15 minutes. The thus obtained magnetic coating was applied on a polyester film to a coat thickness of 5 μm to obtain a coat. After magnetic field-orienting treatment and drying, the magnetic coating was measured for the reflectance at a reflection angle of 60° using a glossmeter, and the reflectance was recorded as "glossiness".

5) Stability in dispersion

The magnetic coating used for the evaluation of glossiness was applied on a polyester film to a coat thickness of 5 μm. After magnetic field-orienting treatment and drying, the magnetic coat was measured (for the reflectance at a reflection angle of 60° using a glossmeter, and the reflectance was recorded as "stability in dispersion".

6) Squareness (Br/Bm)

A strip of 12.5 mm × 50 mm was cut out of the magnetic coat used for the evaluation of glossiness, and measured for the Br/Bm ratio using a magnetic characteristics-measuring machine.

7) Durability

The magnetic coat used for the evaluation of glossiness was subjected to smooth treatment using a calender roller, heat-treated at 65° for 65 hours. Then, the resulting coat was contacted, with a load of 100 g, with a rotating drum which rotates at 150 rpm and on which an abrasive paper was stuck. The degree in which the magnetic coating adhered to the abrasive paper was classified into the three stages of A (no stain), B (small extent of stains) and C (a lot of stains) by visual observation.

EXAMPLE 10

Acetone (180 parts), 70 parts of deionized water, 2 parts of lauroyl peroxide, 6 parts of allyl 2-hydroxy-3-chloropropyl ether, 10 parts of ammonium 3-allyloxy-2-hydroxypropane sulfate and 10 parts of isobutyl vinyl ether were charged in a polymerization vessel. After

TABLE 1

| | | | Example | | | | | Comparative example | | | | | | |
|---|---|---|---|---|---|---|---|---|---|---|---|---|---|---|
| | | | 1 | 2 | 3 | 4 | 5 | 1 | 2 | 3 | 4 | 5 | 6 | 7 |
| Characteristics of the copolymer | Copolymer | | A | B | C | D | E | F | G | H | I | J | K | L |
| | Composition | Carboxylic acid groups | 1.3 | 0.8 | 0.7 | 0.4 | 0.4 | 1.3 | 2.5 | 0.4 | 4.0 | 1.5 | 0.8 | — |
| | | Hydroxyl groups | 0.2 | 0.4 | 0.4 | 0.1 | 0.1 | 0.3 | 0.5 | 0.6 | 2.3 | *1.6 | — | *2.3 |
| | Equivalent ratio of hydroxyl groups/ carboxyl groups | | 0.41 | 1.32 | 1.15 | 0.66 | 0.66 | 0.61 | 0.53 | 4.0 | 1.52 | 2.82 | — | — |
| | Polymerization degree | | 400 | 380 | 390 | 450 | 400 | 460 | 360 | 600 | 530 | 420 | 430 | 450 |
| Characteristics of the magnetic coating and magnetic recording medium | Pot life | (day) | >30 | 24 | 20 | >30 | >30 | >30 | 20 | 24 | 1 | 26 | >30 | 20 |
| | Reactivity | (%) | 82 | 90 | 90 | 85 | 80 | 52 | 70 | 65 | 90 | 82 | 17 | 80 |
| | Heat stability | (hour) | 40 | 42 | 38 | 45 | 43 | 20 | 20 | 15 | 0.5 | 0.5 | 0.5 | 6 |
| | Glossiness | (%) | 76 | 82 | 80 | 75 | 79 | 75 | 69 | 40 | 40 | 60 | 52 | 32 |
| | Stability in dispersion | (%) | 68 | 72 | 70 | 72 | 73 | 55 | 43 | 20 | 7 | 12 | 43 | 17 |
| | Squareness | | 0.83 | 0.84 | 0.84 | 0.83 | 0.84 | 0.82 | 0.81 | 0.76 | 0.75 | 0.78 | 0.76 | 0.75 |
| | Durability | | A | A | A | A | A | A | A | B | B | A | B | C |

*Vinyl alcohol

EXAMPLE 6

Methanol (117 parts), 0.6 part of methylcellulose and 0.2 part of polyoxyethylenesorbitan fatty acid partial ester were charged in a polymerization vessel, which was then sealed. After deaeration under reduced pressure, 100 parts of vinyl chloride, 10 parts of vinyl acetate and 6 parts of allyl 2-hydroxypropyl ether were charged, followed by stirring at 50° C. Thereafter, 0.6 part of 3,5,5-trimethylhexanoyl peroxide was charged to start polymerization, and at the same time such a continuous charge in a constant velocity of 3 parts of 2-acrylamido-2-methylpropanesulfonic acid dissolved in 80 parts of methanol was started that all the sulfonic acid may be consumed in 8 hours. 10 hours after the start of reaction, cooling was carried out at the point when the pressure inside the polymerization vessel became 2 kg/cm$^2$, the unreacted vinyl chloride was recovered, and separation of the liquid component was carried out. The resulting solid was washed and dried to obtain copolymer N.

EXAMPLE 7

The procedure of Example 6 was repeated except that methacrylic acid-2-phosphoric acid ethyl ester was used in place of 2-acrylamido-2-methylpropanesulfonic acid to obtain copolymer O.

EXAMPLE 8

The procedure of Example 6 was repeated except that sodium styrenesulfonate was used in place of 2-acrylamido-2-methylpropanesulfonic acid to obtain copolymer P.

EXAMPLE 9

The procedure of Example 6 was repeated except that engenol was used in place of allyl 2-hydroxyethyl ether to obtain copolymer Q.

deaeration, 100 parts of vinyl chloride, was charged followed by increase of the temperature to 55° C. When the polymerization pressure reached 3 kg/cm$^2$, the unreacted vinyl chloride was recovered under reduced pressure. The remaining reaction solution was then mixed with 1000 parts of deionized water to separate the copolymer, which was dried to obtain copolymer R.

EXAMPLE 11

Deionized water (150 parts), 1 part of sodium lauryl sulfate and 1 part of potassium persulfate were charged in a polymerization vessel. After deaeration, 60 parts of vinyl chloride, 3 parts of vinyl acetate, 3 parts of isobutyl vinyl ether and 6 parts of allyl 2-hydroxypropyl ether were charged, followed by increase of the temperature to 60° C. to start polymerization. Then, a mixed liquid of 2 parts of sodium styrenesulfonate and 50 parts of water was continuously poured therein over 10 hours, while 40 parts of vinyl chloride was charged in 4 portions 10 hours after the start of reaction, the unreacted vinyl chloride was recovered. Then, 5 parts of methyl ethyl ketone was mixed with 100 parts of the remaining polymerization solution, frozen and melted to recover a polymerized matter, which was then washed and dried to obtain copolymer S.

COMPARATIVE EXAMPLE 8

The procedure of Example 6 was repeated except that allyl 2-hydroxypropyl ether was not used and 8 parts of 2-hydroxypropyl methacrylate was charged together with 3 parts of 2-acrylamido-2-methylpropanesulfonic acid to obtain copolymer T.

COMPARATIVE EXAMPLE 9

The procedure of Comparative example 8 was repeated except that propyl methacrylate was used in place of 2-hydroxypropyl methacrylate to obtain copolymer U.

COMPARATIVE EXAMPLE 10

The procedure of Example 6 was repeated except that 2-acrylamido-2-methylpropanesulfonic acid was not used to obtain copolymer V.

COMPARATIVE EXAMPLE 11

100 parts of the commercially available vinyl chloride-vinyl acetate-vinyl alcohol copolymer (Composition: 91 wt. % vinyl acetate, 3 wt. % vinyl acetate, 6 wt. % vinyl alcohol), 10 parts of sodium 2-chloroethylsulfate and 500 parts of dimethylformamide were mixed with stirring at 20° C. To this mixture, 5 parts of pyridine was dropwise added in limited amounts, followed by continuation of stirring for 3 hours. The resulting reaction solution was mixed with 5000 parts of deionized water to recover a copolymer, which was then dissolved in tetrahydrofuran, subjected to reprecipitation procedure by methanol and dried to obtain copolymer W.

COMPARATIVE EXAMPLES 12 TO 14

Acetone (180 parts), 2 parts of benzoyl peroxide and 25 parts of vinyl acetate were charged in a polymerization vessel and deaerated, 50 parts of vinyl chloride was charged, and polymerization was started at 55° C. Then, a mixture of 3 parts of sodium styrenesulfonate and 17 parts of deionized water was continuously poured therein with a constant velocity over a period of 8 hours, while 50 parts of vinyl chloride was charged in 4 portions. 10 hours after the reaction, the unreacted vinyl chloride was recovered Then, 300 parts of methanol and 6 parts of 65 % nitric acid were added to the resulting polymerization solution and mixed with stirring and heating to 80° C. for 12 hours, and 1000 parts of deionized water was added to separate a copolymer. Then, 400 parts of acetone and 5 parts of propylene oxide were added to the copolymer and mixed at 60° C. for 2 hours, 1000 parts of methanol was mixed therewith, and after removal of the liquid part the copolymer was dried to obtain copolymer X.

Characteristics of the above copolymers N to X are indicated in Table 2 together with those of the commercially available vinyl chloride-vinyl acetate-maleic acid terpolymer (copolymer Y) and vinyl chloride-vinyl acetate-vinyl alcohol terpolymer (copolymer Z). The amounts of hydroxyl groups, vinyl chlorides and strong acid radicals in each copolymer were determined by the infrared absorption analysis, by quantitative determination of the chlorine by burning and by use of the elementary analysis and infrared absorption analysis together, respectively.

TEST EXAMPLE 2

Performances of the above copolymers N to Z as a magnetic coating and a magnetic recording medium were tested by the following methods. The results are shown in Table 2.

1) Solubility

A solution consisting of 100 parts of the vinyl chloride copolymer, 200 parts of methyl ethyl ketone and 200 parts of toluene was prepared, and the degree of transparency of this solution was classified into three stages of A (transparent), B (small amount of insoluble matters) and C (large amount of insoluble matters) by visual observation.

2) Heat stability

The vinyl chloride copolymer (1.0 g) was sampled in a 15-cc test tube, the opening was plugged with absorbent cotton between which a Congo red test paper was put. The resulting test tube was placed in an oil bath of 150° C., and the time (minutes)taken for the Congo red test paper to discolor due to the generated hydrochloric acid was measured and recorded as "heat stability".

3) Stability in dispersion

A mixture consisting of 400 parts of metal iron magnetic powder, 100 parts of the vinyl chloride copolymer, 300 parts of methyl ethyl ketone, 300 parts of methyl isobutyl ketone and 300 parts of toluene was sheared with high speed for 90 minutes. The resulting dispersion coating was sampled in a sample bottle and preserved in a constant temperature bath, and generation of gel was observed and classified into three stages of A (excellent), B (good) and C (bad) in the order of smaller generation of gel. Whether gel was generated was examined by a method of taking out a part of the dispersion coating on a glass plate, diluting it with about five times amount of methyl ethyl ketone, mixing the mixture with a glass bar and visually observing the mixture.

4) Glossiness

A mixture consisting of 400 parts of metal iron magnetic powder, 70 parts of the vinyl chloride copolymer, 30 parts of the polyurethane resin (NIPPOLLAN 2304 made by Nippon Polyurethabne Kogyo Co., Ltd.), 300 parts of methyl ethyl ketone, 300 parts of methyl isobutyl ketone, 300 parts of toluene, 4 parts of higher fatty acid and 2 parts of silicone oil was sheared with high speed for 90 minutes to give a dispersion. Then, 15 parts of the polyisocyanate (CORONATE-L made by Nippon Polyurethane Kogyo Co., Ltd.) and 100 parts of cyclohexanone were added and the mixture was dispersed for 90 minutes. The obtained magnetic coating was applied onto a polyester film to a coat thickness of 5 $\mu$m. The resulting magnetic coat was subjected to magnetic field orienting treatment, dried and measured for the reflectance in a reflection angle of 60° using a glossmeter, and the reflectance was recorded as "glossiness".

5) Squareness (Br/Bm)

A strip of 12.5 mm×50 mm was cut out from the magnetic coat used for the evaluation of glossiness and measured for Br/Bm value using a magnetic characteristicsmeasuring machine.

6) Durability

The magnetic coat used for the evaluation of glossiness was subjected to smoothness treatment using a calender roller, subjected to heat treatment at 65° for 65 hours, and contacted, with a load of 100 g, with a rotating drum which rotates at 150 rpm and on which an abrasive paper was stuck. The degree in which the magnetic coating adhered to the abrasive paper was classified into the four stages of A (no stain), B (very slight stains), C (small extent of stain) and D (a lot of stains) by visual observation.

7) Travelling performance

The force which was generated between the coat and the rotating drum when the same method as in the durability test was carried out was measured under the atmosphere by temperature of 65° C. and relative humidity of 80 % using a U gage, and classified into the three stages of A (low), B (medium) and C (high) in the order of less travelling resistance.

TABLE 2

|  |  | Example | | | | | | Comparative example | | | | | | |
|---|---|---|---|---|---|---|---|---|---|---|---|---|---|---|
|  |  | 6 | 7 | 8 | 9 | 10 | 11 | 8 | 9 | 10 | 11 | 12 | 13 | 14 |
| Properties of the resin | Sample name | N | O | P | Q | R | S | T | U | V | W | X | Y | Z |
|  | Vinyl chloride (wt. %) | 88 | 89 | 87 | 86 | 88 | 90 | 85 | 85 | 87 | 90 | 86 | 86 | 91 |
|  | Strong acid radicals (wt. %) | 1.0 | 0.8 | 0.6 | 1.0 | 1.4 | 1.3 | 1.0 | 0.9 | — | 1.0 | 1.0 | 0.8*[1] | — |
|  | Hydroxyl groups (wt. %) | 0.5 | 0.5 | 0.4 | 0.3 | 0.5 | 0.4 | 0.9 | — | 1.0 | 2.1 | 2.7 | — | 2.3 |
|  | Polymerization degree | 320 | 320 | 340 | 340 | 290 | 400 | 320 | 310 | 380 | 430 | 360 | 400 | 430 |
| Characteristics of the magnetic coating or magnetic recording medium | Solubility | A | A | A | A | A | A | A | A | A | A | A | A | A |
|  | Heat stability (min.) | 30 | 29 | 28 | 29 | 30 | 29 | 20 | 20 | 28 | 3 | 4 | 15 | 6 |
|  | Stability in dispersion | A | A | A | A | A | A | A | A | —*[2] | A | A | C | C |
|  | Glossiness (%) | 96 | 96 | 88 | 96 | 93 | 93 | 96 | 97 | — | 77 | 82 | 30 | 10 |
|  | Squareness | 0.82 | 0.82 | 0.81 | 0.82 | 0.81 | 0.81 | 0.82 | 0.82 | — | 0.79 | 0.80 | 0.68 | 0.66 |
|  | Durability | A | A | A | A | A | A | B | C | — | C | C | D | D |
|  | Travelling performance | A | A | A | A | A | A | A | C | — | A | B | C | B |

*[1] Carboxyl group
*[2] A magnetic coating was not obtained because the magnetic powder was not uniformly dispersed.

We claim:

1. A magnetic coating comprising magnetic powder, a binder and an organic solvent, characterized in that at least one component of the binder is a vinyl chloride copolymer having hydroxyl groups, and carboxylic acid groups or sulfur or phosphorus-containing strong acid radicals, and the comonomer supplying the hydroxyl groups is a monoallyl ether of polyhydroxy compound.

2. The magnetic coating of claim 1, wherein the monoallyl ether of polyhydroxy compound is a member selected from the group consisting of an alkylene glycol monoallyl ether, a polyoxyalkylene glycol monoallyl ether, a glycerine monoallyl ether, a monoallyl ether of a halogen- or hydroxy- substituted (poly)alkylene glycol, a monoallyl ether of a polyhydric phenol and a monoallyl ether of a halogen-substituted polyhydric phenol.

3. The magnetic coating of claim 1 wherein the content of the hydroxyl groups in the vinyl chloride copolymer is 0.05 to 3.0 wt. %.

4. The magnetic coating of claim 1, wherein the carboxylic acid groups in the vinyl chloride copolymer are supplied by a comonomer selected from the group consisting of an unsaturated monocarboxylic acid, an unsaturated dicarboxylic acid and a monoalkyl ester of an unsaturated dicarboxylic acid.

5. The magnetic coating of claim 1 wherein the content of the carboxylic acid groups in the vinyl chloride copolymer is 0. to 5.0 wt. %.

6. The magnetic coating of claim 1 wherein the sulfur or phosphorus-containing strong acid groups are present in the vinyl chloride copolymer and are supplied by a radially polymerizable comonomer having a strong acid containing sulfur or phosphorus or its alkali metal salt or ammonium salt.

7. The magnetic coating of claim 1 wherein the content of the strong acid groups in the vinyl chloride copolymer is 0.1 to 4.0 wt.%.

8. A magnetic recording medium prepared by applying the magnetic coating of any one of claims 1 to 7 on a substrate.

* * * * *